(12) United States Patent
Addington

(10) Patent No.: US 11,986,008 B2
(45) Date of Patent: May 21, 2024

(54) METHOD OF PROCESSING CANNABIS

(71) Applicant: David Addington, Piedmont, CA (US)

(72) Inventor: David Addington, Piedmont, CA (US)

( * ) Notice: Subject to any disclaimer, the term of this patent is extended or adjusted under 35 U.S.C. 154(b) by 367 days.

(21) Appl. No.: 17/464,312

(22) Filed: Sep. 1, 2021

(65) Prior Publication Data

US 2023/0068926 A1 Mar. 2, 2023

(51) Int. Cl.
| | |
|---|---|
| *A24B 15/24* | (2006.01) |
| *A24B 15/30* | (2006.01) |
| *A24C 5/02* | (2006.01) |
| *A24D 1/02* | (2006.01) |
| *B01D 3/38* | (2006.01) |
| *B01D 11/02* | (2006.01) |
| *D21H 11/12* | (2006.01) |
| *D21H 23/66* | (2006.01) |

(52) U.S. Cl.
CPC .............. *A24B 15/241* (2013.01); *A24D 1/02* (2013.01); *B01D 3/38* (2013.01); *B01D 11/0257* (2013.01); *B01D 11/0288* (2013.01); *D21H 11/12* (2013.01); *D21H 23/66* (2013.01); *A24C 5/02* (2013.01)

(58) Field of Classification Search
CPC .................................................... A24B 15/241
See application file for complete search history.

(56) References Cited

U.S. PATENT DOCUMENTS

| | | |
|---|---|---|
| 8,161,979 B1 | 4/2012 | Sinclair, Jr. |
| 2004/0021858 A1 | 2/2004 | Shima et al. |
| 2006/0039959 A1 | 2/2006 | Wessling |
| 2013/0313146 A1 | 11/2013 | Idheileh |
| 2014/0328006 A1 | 11/2014 | Mitlin et al. |
| 2016/0130762 A1 | 5/2016 | Ramaratnam |
| 2017/0112188 A1 | 4/2017 | Ostrander |
| 2017/0360082 A1 | 12/2017 | Slama et al. |
| 2020/0253264 A1* | 8/2020 | Rousseau et al. ..... A24B 15/16 |

OTHER PUBLICATIONS

"What is Twaxing?", https://www.massroots.com/learn/twaxing/ (Dec. 16, 2014), printed Oct. 7, 2021.

* cited by examiner

*Primary Examiner* — Christopher M Rodd
*Assistant Examiner* — Ronnie Kirby Jordan
(74) *Attorney, Agent, or Firm* — Miller Nash LLP

(57) ABSTRACT

A smokable product is an organoleptically homogenous smokable material comprising shredded hemp paper that has been treated with a solution of cannabinoids and terpenes, and a wrapping paper to hold the smokable material in a rolled form. A method includes grinding cannabis plants, removing terpenes and cannabinoids from the cannabis plants, leaving cannabis fibers, pulping the cannabis fibers to produce hemp paper, shredding the hemp paper to produce shredded paper, combining at least the terpenes and cannabinoids into a solution based upon a predetermined formula, spraying the shredded paper with the solution to produce smokable material, and rolling the smokable material into a cigarette.

12 Claims, 2 Drawing Sheets

METHOD OF PROCESSING CANNABIS

TECHNICAL FIELD

This disclosure relates to process of processing cannabis plants, more particularly to a method of processing cannabis to produce organoleptic homogenous products.

BACKGROUND

Cannabis plants have noticeable variations in their taste, effect, terpenes and cannabinoids even within the same plant. Flowers from different sides of the plant, those that receive differing amounts of sun and shade, and from top to bottom, as examples. The differences may take the form of differences in taste, smell, effect on the body, concentration of terpenes, and concentration and nature of cannabinoids.

In addition, most post-harvest processing involves processing, drying, curing, trimming, and sorting the flowers. This increases the costs of the final product from the overhead costs of the processing. Current estimates approximate these costs at $100 per pound of final product. Further, most current post-processing discards much of the plant material beyond the flowers and the seeds.

DETAILED DESCRIPTION OF THE EMBODIMENTS

The embodiments here differ from current processing methods in that they use the entire plant as harvested and can process the plant matter and produce cannabis cigarettes in far less time and for far less costs than typical processing methods. The embodiments produce cannabis cigarettes with homogeneity across several characteristics. "Homogeneity" as used here means that the resulting cigarette or other products have a consistent measure across the product line, each cigarette in a particular product line having the same characteristics. These characteristics may include smell, taste, organoleptic effects, cannabinoid concentration, and terpene concentration. The term "organoleptic" means acting on, or involving the use of the sense organs, so "organoleptic homogeneity" or "organoleptically homogenous" means that the effects on the human body resulting from use of the product are consistent for all of the products.

Figure 1:
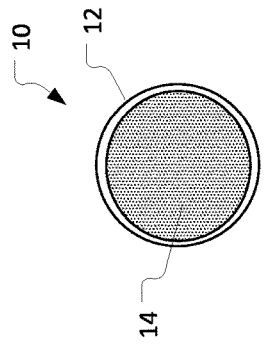
FIG. 1 shows an embodiment of a smoking product.
Figure 2:
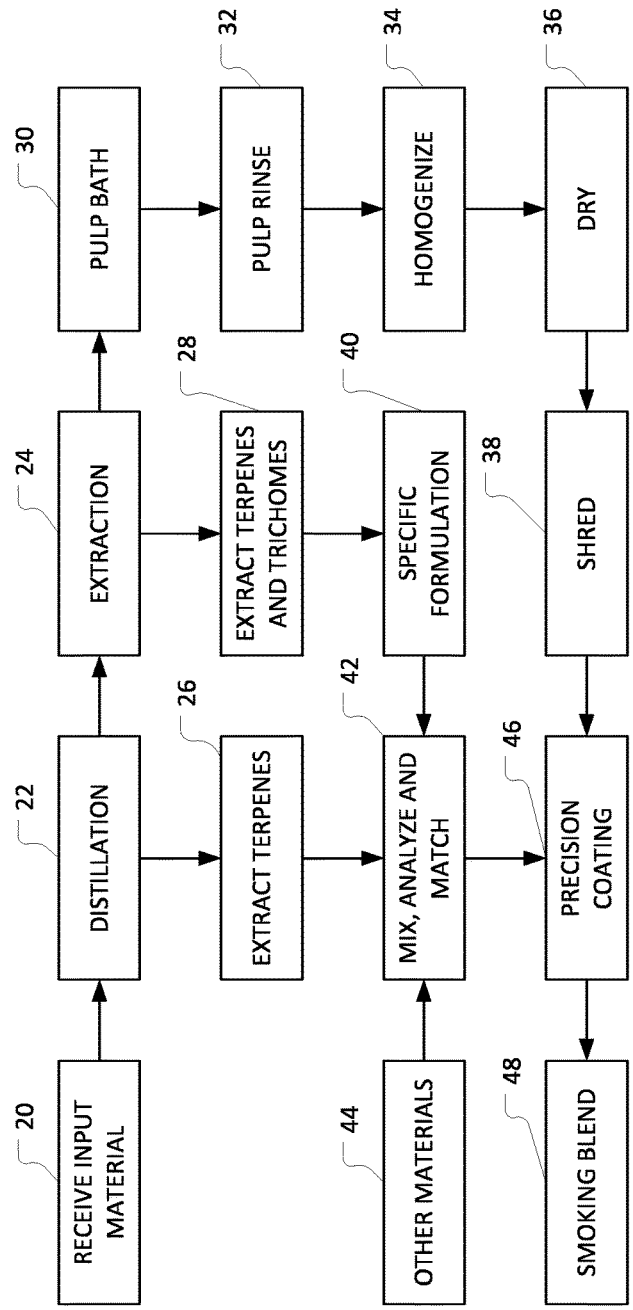
FIG. 2 shows a flowchart of an embodiment of manufacturing a smoking product.

FIG. 1 shows an embodiment of a smoking product 10 having organoleptic homogeneity. Unlike some prior art embodiments, in which hemp paper is used as the rolling paper around plant material, the paper in these embodiments is contained in the cigarette to be smoked. In FIG. 1, the hemp paper smokable material 14 created by a process such as that shown in FIG. 2 is contained in a wrapping paper 12. Unique to these embodiments, the smokable material has organoleptic homogeneity across all cigarettes in a given product line, meaning that each cigarette for a particular blend of terpenes and cannabinoids will have the same effects as each other cigarette of that blend.

Embodiments of the process generally begin at harvest. Once harvested, the entire plants undergo processing. FIG. 2 shows an embodiment of a process to prepare a smoking product from the cannabis plant. One should note that the process shown in FIG. 2 may have optional steps or processes included in the discussion for completeness.

At 20, the process starts with the harvest of cannabis plants. As noted above, the entire plant undergoes processing, not just the flowers or the fibers. Initially, the plant material undergoes grinding. Grinding as used here means a process that does not pulverize the plant material, but separates enough that one can remove parts of the plant.

The process then places the plant matter in a vessel to allow distillation of the terpenes out of the plant matter at 22. In one embodiment this occurs in a steam distillation vessel. In one embodiment, the distillation occurs at 220° F. for 2-4 hours, or more generally in the range of 200° to 240°. The resulting fluid from this process will then be gathered at 26. The material then moves into an extraction bath at 24. In one embodiment, the extraction bath may comprise a cold water extraction bath for trichome removal. The bath may be agitated for a period of time ranging from 20 to 40 minutes, and in one embodiment for 30 minutes. The temperature may range from 32°-34° F. This will allow for further terpenes and the trichomes to be removed out of the fibers at 28. In alternative embodiments, the steam bath and the cold water bath may occur in a different order. The cold water bath may come first and then the steam bath.

At this point, several processes may occur separately from each other, simultaneously or not. At 20, the fibers left over from the distillation and extraction processes move into a pulping process at 30. The pulp bath 30 may comprise an alkaline pulp bath that causes the cellulose fibers of the plants to breakdown into pulp. The pH of the bath may range from 11 to 14. The temperature may range from 140° F.-200° F., and the time from 1-5 hours. The pulp then undergoes screening, in which they are rinsed through a screen at 32. In one embodiment, the screen has openings in the range of 25-220 microns. In one embodiment, the rinsing process continues until the pH reaches a pH of less than 10.

After rinsing, the pulp is homogenized as 34. This may comprise mixing the pulp using a mixer. In one embodiment, the mixer may be a rotor-stator mixer, such as a colloid mill often used to reduce particle or droplet size in an emulsion. The pulp may be mixed in a solution of 12-15 liters of water, for a time period ranging from 30 minutes to 2 hours, and temperatures of up to 140°. The resulting pulp is then captured by a screen having a size in a range of 25 to 190 microns and then air dried to form hemp paper at 36. One should note that the resulting paper qualifies as hemp, as it will have a tetrahydrocannabinol (THC) content of less than 0.3%, which qualifies as hemp under the 2018 Farm Bill.

The paper, once dried is then shredded in a manner similar to tobacco leaves at 38. In one embodiment the moisture level of the paper is brought to approximately 10%. This may be done in a steam press. This process may use the steam press for a predetermined period of time in the range of 15 to 45 seconds, such as 30 seconds. A shredder then shreds the paper at 38. The shredder may comprise a tobacco shredder that shreds the paper into 0.8 millimeter pieces, producing a smokable material from the paper.

The discussion moves back to the terpenes and trichomes that were extracted at 26 and 28. These compositions will be applied as decided by the specific formulation at 40. The formulation may have a predetermined mix of terpenes, cannabinoids, flavors, herbs, and oils in a mix at 42. For example, a particular product may have a first mix, and a second product may have a second mix. The embodiments here have a goal of making the mix of terpenes and cannabinoids homogenous across the paper. This causes the hemp paper, when smoked, to have organoleptic homogeneity, meaning that each instance of a smoking product, referred to here as a "cigarette," within a particular product line will have the same effect on a human. The mix may include propylene glycol, vegetable glycerin, vegetable oil, and medium-chain triglyceride (MCT) oil, included in the other materials 44.

At 42, the mix is analyzed to ensure the resulting mix matches the desired formulation. If it does not match, the solution would then be modified until it matches the desired formulation. The process may use a Fourier transform near-infrared (FT-NIR) spectrometer, a non-destructive chemical analysis technology that identifies and analyze various materials. Other type of spectrometers may also be used.

Once the desired mix has been verified, a precision coater or other spraying mechanism may apply the mixture to the hemp smokable material at 46 to produce a smoking blend 48. In one embodiment, after the hemp smokable material receives its coating of the mixture, it is rolled inside a "standard" cigarette paper to hold the smokable material in a rolled form. In some embodiments, the hemp smoking paper is rolled into cigarettes using an industry-standard cigarette rolling machine, such as a Molins cigarette machine.

Figure 3:
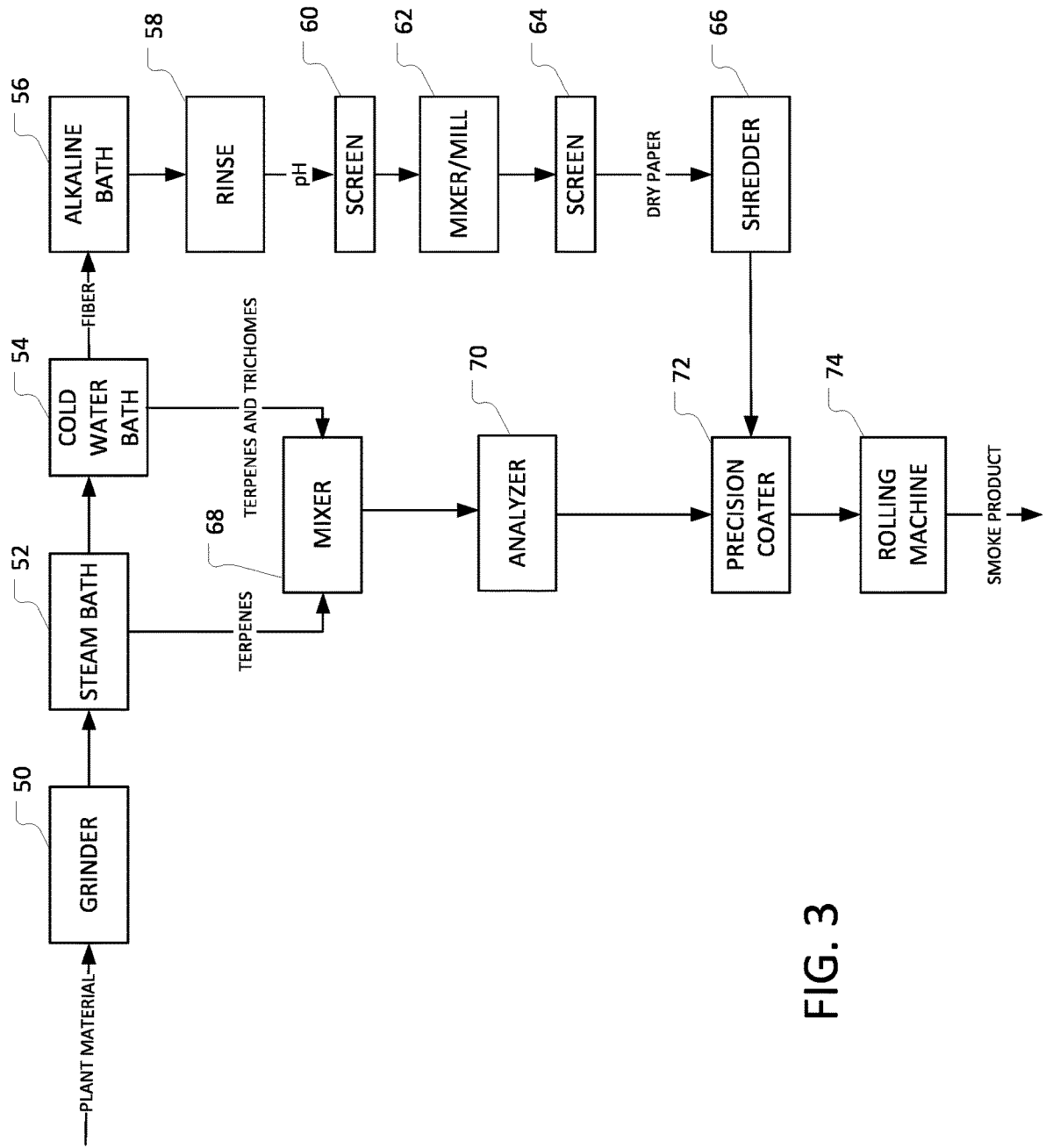
FIG. 3 shows a diagram of an apparatus for manufacturing a smoking product.

The process above may use many different type of machines and apparatus to manufacture the smoking product. FIG. 3 shows an embodiment of a set of machines and apparatus that could be used. One should note that the examples of FIG. 3 are merely for completeness and do not any way imply any limitation to particular machines or apparatus or their combinations.

After harvest, the plant material is received at a grinder 50. After the plant material has undergone grinding, it is placed in a vessel in which the ground material is subject to a steam bath. The steam bath results in distillation of the terpenes out of the plant matter. The distilled plant matter then undergoes a cold water bath 54, which may be accomplished with something that mimics a washing machine. The cold water bath strips off the seeds and further removes terpenes, as well as the trichomes from the plant material. This also removes the cannabinoids from the fibers.

The fiber then goes into another bath 56. In this bath, the solution in which the fiber is washed is alkaline, as discussed above. The material is then rinsed with a source of water at 58, into a screen 60. The screen captures the hemp material that can then by mixed into a homogenous mixture at 62. The homogenous mixture is then rinsed into a screen at 64. The rinsed and screened material is then dried to form paper. The paper then undergoes shredding by shredder 66.

Returning up to the mixer 68 in which the terpenes and cannabinoids are mixed with other ingredients. The mix is analyzed and confirmed by analyzer 70 to match the desired formulation for the particular product being manufactured in any given production run. Once that is confirmed, a precision coater 72 or other spraying mechanism that can spray heavier or thicker solutions on the shredded material. The material is then wrapped in a 'standard' rolling paper, to result in a smoking product that has an organoleptic homogeneous effect on the users. The wrapping machine 74 may be a manual or automatic rolling machine.

As noted above, the various machines and apparatuses of FIG. 3 are merely examples and are not intended to limit the scope of the claims in any way.

In this manner, one can manufacture a smoking product that has organoleptic homogeneity using a method that scales easily and can use standard machinery to roll uniform cigarettes.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the embodiments.

What is claimed is:

1. A method, comprising:
    separating parts of entire *cannabis* plants to allow removal of the parts without pulverizing the *cannabis* plant material;
    removing terpenes and cannabinoids from the *cannabis* plants, leaving *cannabis* fibers;
    pulping the *cannabis* fibers to produce hemp paper;
    shredding the hemp paper to produce shredded paper;
    combining at least the terpenes and cannabinoids into a solution based upon a predetermined formula;
    spraying the shredded paper with the solution to produce smokable material; and
    rolling the smokable material into a cigarette.

2. The method as claimed in claim 1, wherein separating pars of entire *cannabis* plants comprises separating parts of entire hemp plants having a tetrahydracannabinoid content of less than 0.3%.

3. The method as claimed in claim 1, wherein removing the terpenes and cannabinoids comprises distilling the terpenes from the *cannabis* plants and then extracting the cannabinoids from trichomes of the plants.

4. The method as claimed in claim 3, wherein distilling the terpenes comprised placing the *cannabis* plants into a steam bath to distill terpenes into a solution.

5. The method as claimed in claim 3, wherein extracting the cannabinoids comprises using a cold bath to agitate and rinse the *cannabis* plants to extract the cannabinoids into a solution.

6. The method as claimed in claim 5, wherein using a cold bath to agitate and rinse the *cannabis* plants comprises using a cold bath to agitate and rinse the *cannabis* plants to reach a pH of less than 10.

7. The method as claimed in claim 1, wherein pulping the *cannabis* fibers comprises:
    putting the *cannabis* fibers into an alkaline bath to break the *cannabis* fibers into pulp;
    screening the pulp;
    mixing the pulp;
    capturing the pulp in a screen; and
    drying the pulp to produce the hemp paper.

8. The method as claimed in claim 1, wherein shredding the paper comprises shredding the paper into 0.8 millimeter pieces.

9. The method as claimed in claim 1, wherein combining at least the terpenes and cannabinoids into the solution comprises combining terpenes and cannabinoids with at least one of propylene glycol, vegetable glycerin, vegetable oil, and medium-chain triglyceride oil.

10. The method as claimed in claim 1, wherein combining at least the terpenes and cannabinoids comprises combining terpenes and cannabinoids into the solution, analyzing the solution to match it against the predetermined formula, and adjusting ingredients as needed.

11. The method as claimed in claim 1, wherein spraying the shredded paper with the solution comprises using a precision coater to spray the solution.

12. The method as claimed in claim 1, wherein rolling the smokable material into a cigarette comprises using a cigarette rolling machine to roll the smokable material into a cigarette.

\* \* \* \* \*